US009142100B2

(12) United States Patent
Suda

(10) Patent No.: US 9,142,100 B2
(45) Date of Patent: *Sep. 22, 2015

(54) VIDEO SLOT GAMING MACHINE

(71) Applicant: Konami Gaming, Inc., Las Vegas, NV (US)

(72) Inventor: Satoshi Suda, Henderson, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,936

(22) Filed: Jun. 4, 2013

(65) Prior Publication Data

US 2013/0267301 A1 Oct. 10, 2013

Related U.S. Application Data

(63) Continuation of application No. 12/855,924, filed on Aug. 13, 2010, now Pat. No. 8,485,885.

(51) Int. Cl.

| | |
|---|---|
| ***A63F 13/00*** | (2014.01) |
| ***G07F 17/34*** | (2006.01) |
| ***G07F 17/32*** | (2006.01) |

(52) U.S. Cl.

CPC ............ *G07F 17/34* (2013.01); *G07F 17/3267* (2013.01)

(58) Field of Classification Search

CPC ... G07F 17/32; G07F 17/326; G07F 17/3267; G07F 17/34

USPC .......................................... 463/16, 20, 21, 23

See application file for complete search history.

(56) References Cited

U.S. PATENT DOCUMENTS

| | | | |
|---|---|---|---|
| 7,090,580 | B2 | 8/2006 | Rodgers et al. |
| 7,326,113 | B2 | 2/2008 | Bennett et al. |
| 7,527,557 | B2 | 5/2009 | Jackson |
| 7,727,069 | B1 | 6/2010 | Nelson |
| 2004/0038731 | A1 | 2/2004 | Englman |
| 2005/0266916 | A1 | 12/2005 | Sato et al. |
| 2006/0025204 | A1 | 2/2006 | Okada |
| 2006/0197279 | A1 | 9/2006 | Shimizu et al. |
| 2007/0026931 | A1 | 2/2007 | Kobayashi |
| 2007/0178964 | A1 | 8/2007 | Ghaly |
| 2008/0051179 | A1 | 2/2008 | Okada |
| 2008/0051181 | A1 | 2/2008 | Okada |
| 2008/0070673 | A1 | 3/2008 | Bennett et al. |

(Continued)

FOREIGN PATENT DOCUMENTS

| | | | |
|---|---|---|---|
| EP | 1 418 553 | A2 | 5/2004 |
| WO | 2009/148908 | A1 | 12/2009 |

OTHER PUBLICATIONS

AU Examiner's 1st Report dated Nov. 1, 2010.

(Continued)

*Primary Examiner* — Allen Chan

(74) *Attorney, Agent, or Firm* — Howard & Howard Attorneys PLLC

(57) ABSTRACT

A gaming machine and method are provided which provide a video slot game to a player. The video slot game includes a plurality of cells arranged in a grid. The grid has a plurality of rows and columns. The machine and method display a first instance of the video slot game and in response to occurrence of a triggering event, video slot game is split and second and third instances of the video slot game are displayed and played.

20 Claims, 5 Drawing Sheets

(56) References Cited

U.S. PATENT DOCUMENTS

| | | | |
|---|---|---|---|
| 2008/0161098 | A1 | 7/2008 | Nelson |
| 2008/0318664 | A1 | 12/2008 | Saito |
| 2009/0042652 | A1 | 2/2009 | Baerlocher et al. |
| 2009/0117971 | A1 | 5/2009 | Yoshizawa |
| 2009/0143131 | A1 | 6/2009 | Yoshizawa |
| 2009/0143132 | A1 | 6/2009 | Yoshizawa |
| 2009/0247274 | A1 | 10/2009 | Abe |
| 2009/0291738 | A1 | 11/2009 | Visser |
| 2009/0305768 | A1 | 12/2009 | McKay et al. |
| 2010/0048287 | A1 | 2/2010 | Yoshizawa et al. |

OTHER PUBLICATIONS

AU Examiner's 2nd Report dated May 19, 2011.
Patent Examination Report No. 1 (AU2013267012)—Date of Issue Jan. 21, 2014.
Patent Examination Report No. 2—Date of Issue Nov. 5, 2013.

VIDEO SLOT GAMING MACHINE

CROSS REFERENCE TO RELATED APPLICATION

This application is a continuation application of U.S. patent application Ser. No. 12/855,924, filed Aug. 13, 2010, the disclosure of which is hereby incorporated by reference in its entirety.

FIELD OF THE INVENTION

The present invention relates generally to video gaming machines and more particularly, to an apparatus and method for playing a video slot machine which splits a video slot game into two separate instances of the video slot game upon the occurrence of a triggering condition.

BACKGROUND OF THE INVENTION

Gaming machines, such as slot machines, are a cornerstone of the gaming industry. Generally, the popularity of such machines with players is dependent on the perceived likelihood of winning money at the particular game and the intrinsic entertainment value of the game relative to other available gaming options. Where the available gaming options include a number of competing games and the expectation of winning each game is believed to be generally the same, players are most likely to be attracted to the most entertaining and exciting games. Thus, gaming operators strive to employ the most entertaining and exciting games available because such games attract frequent play and, hence, increase profitability to the operator.

Furthermore, one concept that has been successfully employed to enhance the entertainment value of the game is the addition of a bonus game that may be played in conjunction with the "primary" game. The bonus game may comprise any type of game, either similar to or completely different from the primary game. The bonus game is initiated upon the occurrence of a selected event or outcome of the primary game.

Because the excitement and entertainment value of the primary game provides increased player appeal relative to other gaming machines and the bonus game concept increases player appeal and excitement, thereby increasing the chance to win the potential pay-out amount, there is a continuing need to develop new features for primary and bonus games. New features are necessary to appeal to player interest and enhance excitement in order to entice longer play and satisfy demands of operators for interesting games and increased profitability.

The present invention is directed to satisfying these needs.

SUMMARY OF THE INVENTION

In a first aspect of the present invention, a video gaming machine is provided. The video gaming machine includes a video display device and a game controller. The game controller displays a first instance of the video slot game on the video display device, plays the first instance of the video slot game and awards an award to a player as a function of an outcome of the first instance of the video slot game and a predetermined paytable. The game controller also detects a triggering condition in the outcome of the first instance of the video slot game. The triggering condition includes a predetermined symbol located within at least one triggering cell of the video slot game. The game controller, in response to detecting the triggering condition, simultaneously displays second and third instances of the video slot game on the video display device, plays the second instance of the video slot game and awards a second award to the player as a function of an outcome of the second instance of the video slot game and a second predetermined paytable, and plays the third instance of the video slot game and awards a third award to the player as a function of an outcome of the third instance of the video slot game and a third predetermined paytable. The predetermined symbol is copied into the at least one triggering cell of the second and third instances of the video slot game and held throughout the play thereof.

In a second aspect of the present invention, a method of providing a video slot game to a player is provided. The video slot game has a plurality of cells arranged in a grid having a plurality of rows and columns. The method includes the steps of displaying a first instance of the video slot game on a video display device, playing the first instance of the video slot game and awarding an award to a player as a function of an outcome of the first instance of the video slot game and a predetermined paytable, and detecting a triggering condition in the outcome of the first instance of the video slot game. The triggering condition includes a predetermined symbol located within at least one triggering cell of the video slot game. In response to detecting the triggering condition, second and third instances of the video slot game are simultaneously displayed on the video display device. The method further includes the steps of playing the second and third instances of the video slot game and awarding an award to a player as a function of an outcome of the second instance of the video slot game and a second predetermined paytable, wherein the predetermined symbol is copied into the at least one triggering cell of the second and third instances of the video slot game and held throughout the play thereof.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

With reference to the drawings and in operation, the present invention provides a video slot gaming machine 10. In general, the gaming machine 10 displays, and allows a player to play, a first instance of the video slot game, and when a triggering condition occurs, splits the video slot game by simultaneously displaying second and third instances of the video slot game.

Figure 1:
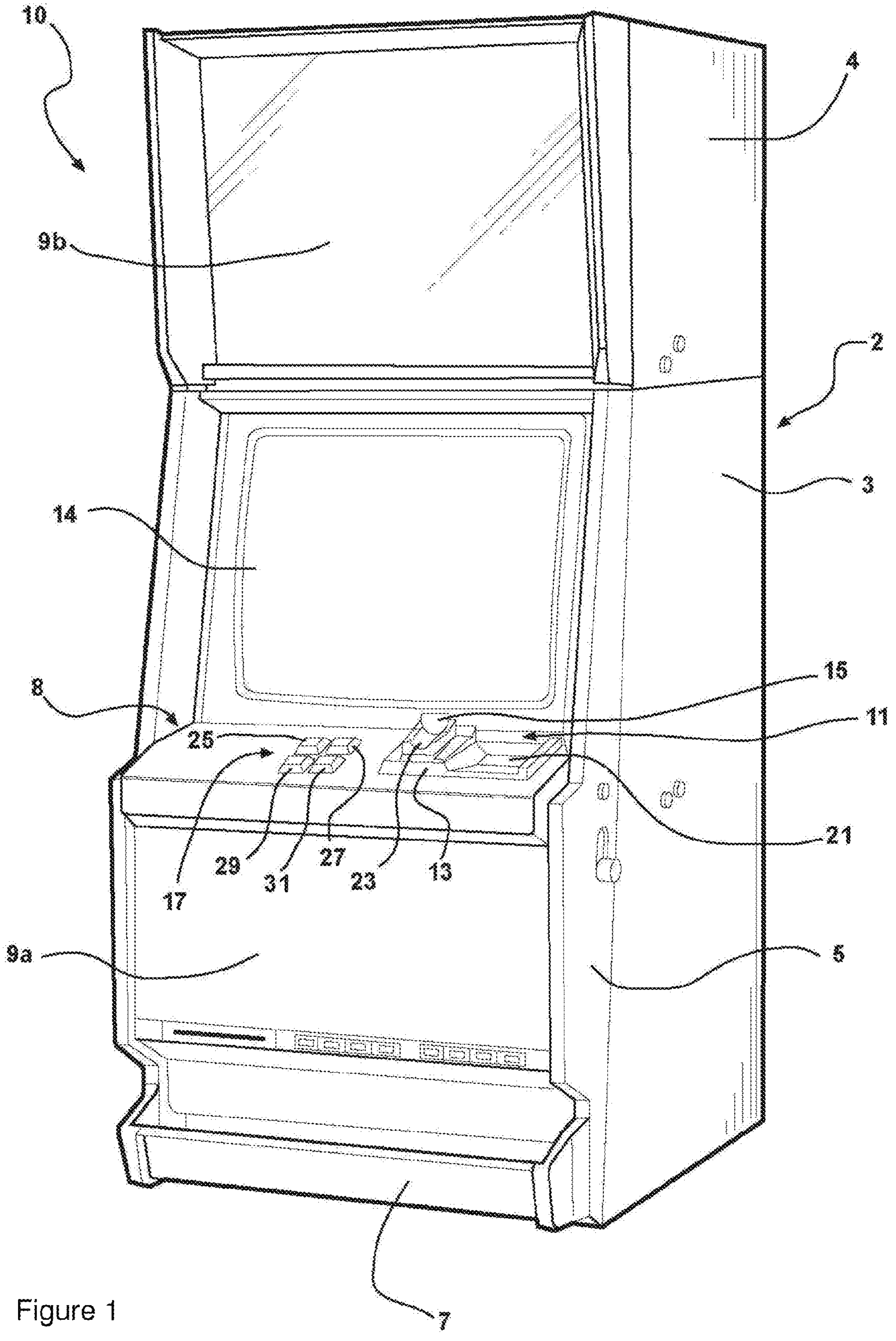
FIG. 1 is a perspective view of a gaming machine.

With specific reference to FIG. 1, an exemplary video gaming machine 10 is illustrated into which the present invention can be incorporated to improve the enjoyment of a video game and to thereby increase the amount of time that the video game is played by patrons of a gaming establishment. FIG. 1 shows a general appearance of the video gaming machine 10 to which the present invention is applied. As shown in the FIG. 1, the machine 10 comprises a housing 2 standing upright. The housing 2 comprises a main body 3, a top box 4 mounted on a top portion of the main body 3 and a door 5 attached to a front side of the main body 3 so as to be swingable between an open position and a close position.

At a center portion of the front side of the main body 3, there is mounted a main display device or display 14 comprising a CRT, and below the display 14 is provided an operation panel 8. The operation panel 8 is attached to the door 5 so as to slope down in a forward direction of the machine 10. Below the operation panel 8 and on a front side of the top box 4, there are provided decoration panels 9*a* and 9*b* on which pictures, letters and the like representing a title of the machine 10 or the like are illustrated.

As shown in FIG. 1, the operation panel 8 is provided, from a right end toward a left end thereof, with an insertion portion 11, and an input portion 17. The insertion portion 11 is provided with a slot base 13 integrally formed with a coin insertion portion 15 and a bill insertion portion 21.

The input portion 17 is provided with four push button switches 25, 27, 29, 31 as first input devices, each of which is capable of being depressed. These push button switches 25, 27, 29, 31 are selected as switches to be operated with particular high frequency during the game, so that these switches are provided on the operation panel 8. For example, the push button switch 29 at a lower left position of the four switches is operated for starting the game. The number of the push buttons provided at the input portion 17 and functions assigned to the push buttons can be properly changed.

Figure 2:
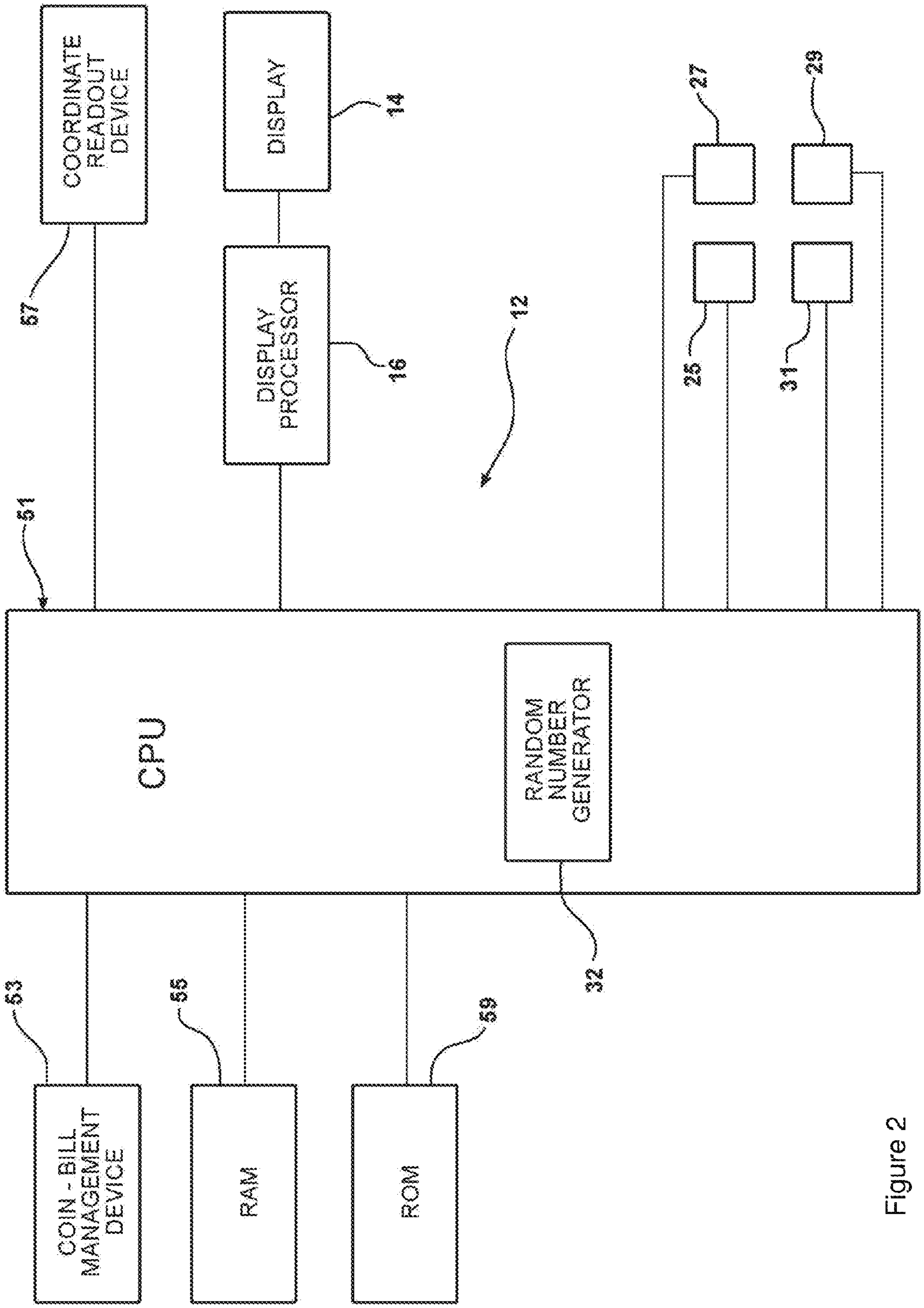
FIG. 2 is a schematic representation of the video gaming machine of the present invention.

Referring now to FIG. 2, a block diagram illustrating a schematic configuration of a control system provided in the machine 10 is depicted, according to one embodiment of the present invention. The machine 10 includes a game controller 12. The game controller 12 includes a central processing unit (CPU) 51, a coin-bill management device 53, a display processor 16, RAM 55 as a memory device and EPROM 59. The CPU 51 is mainly composed of a microprocessor unit and performs various calculations and motion control necessary for the progress of the game.

The coin-bill management device 53 detects the insertion of a coin and a bill from the coin insertion portion 15 and the bill insertion portion 21, and performs a necessary process for managing coins and bills. The display processor 16 interprets commands issued from the CPU 51 and displays desirable images on the display 14. The RAM 55 temporary stores programs and data necessary for the progress of the game, and the EPROM 59 stores, in advance, programs and data for controlling basic operation of the machine 10, such as the booting operation thereof.

The video gaming machine 10 of FIG. 1 further includes the display 14 that displays a video slot game and a player using the video gaming machine 10 interacts with the game.

The CPU 51 is electrically connected with a coordinate readout device 57 as well as the above mentioned pushbutton switches 25, 27, 29, 31. The coordinate readout device 57 works as a second input device and comprises, for example, a so-called touch panel formed as a transparent panel on the display 14 and capable of issuing signals corresponding to the coordinates of a position touched on the display 14 by the player. The coordinate readout device 57 is closely put on the surface of the display 14 and integrated therewith. In the CPU 51, there are provided a payment processor 34 for counting value of money consumed in each game. A random number generator 32 is included for randomly generating numbers during play of the game, as described below.

Figure 3:
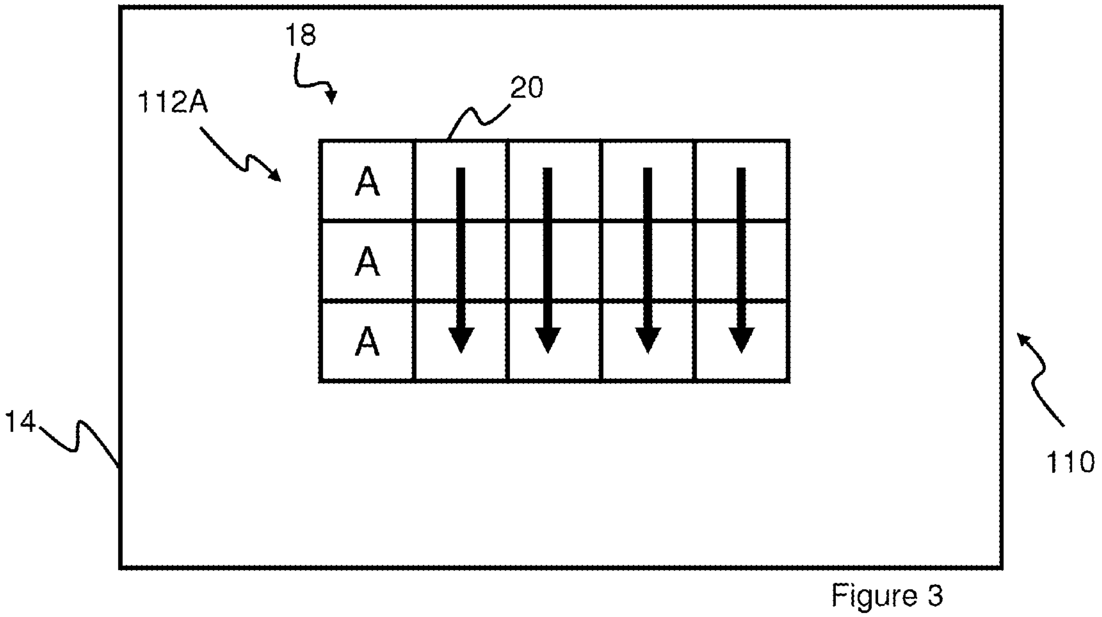
FIG. 3 is an exemplary screenshot of a video slot game, according to a first embodiment of the present invention.

With reference to FIGS. 1 and 3, the game controller 51 sends a signal to a display processor 16 for displaying a plurality of game elements 18 on the display 14. The display includes a cash-out touchpad 41 such that when the cash-out touchpad 41 is touched any accumulated credits are paid to the player in a coin bin 7. A winner paid meter 43 keeps track of credits paid out to a player. A credit meter 45 is displayed for informing the player of the number of winning credits won on a given spin. The touchpad could also be buttons affixed to the machine.

The display 14 further includes a help touchpad 47 for accessing information about the game. A credit meter 49 displays to the player a number of credits available to the player for game play or cash-out. A select lines touchpad 60 allows the player to toggle through and select the available sets of paylines. Preferably, the video slot gaming machine 10 is a multi-line game, i.e., the paylines include horizontal paylines and/or diagonal pay-lines, and/or zig-zag paylines. A bet per line touchpad 61 allows the player to toggle to increase the bet per line a credit at a time (up to the maximum bet).

Returning to FIG. 2, the payment processor 34 is connected to the game controller 12 for awarding a regular payout in response to the game elements 18 displayed on the display 14 matching a winning combination along one of the paylines selected by the player.

With reference to FIG. 3, in one aspect of the present invention, the game controller 12, the display device or display 14 is adapted to display the plurality of game elements 18 in a grid 20 having a plurality of cells defined by rows and columns. During play of the video slot game, the game controller 12 randomly selects the game elements 18 to be displayed in the display device 14. The selected game elements 18 are selected from a set of possible game elements. In the illustrated embodiment, the set of possible game elements includes "9", "10", "J", "Q", K", and "A", and a wild symbol, designated "Wild". It should be noted that any type of symbols or game elements may be used. The game controller 12 is adapted to determine an outcome of the regular game based on the displayed game elements 18, the pay-table, a wager, and predetermined paylines.

It should be noted that the above described gaming machine 12 is for exemplary purposes only. The present invention is not limited to any particular gaming machine. The gaming machine 12 may also include other features. For example, the gaming machine 12 may include a player tracking device (not shown) which is connected to a player tracking system. The gaming machine 12 may also utilize a cashless wagering system (not shown), such as a ticket in ticket out (TITO) system (not shown).

With particular reference to FIGS. 3-8, the game controller 12 displays a first instance 112A of the video slot game 110 on the display 14. The video slot game 110 is played using a plurality of cells arranged in a grid 20 having a plurality of rows and columns. The first instance 112A of the video slot game 110 is generally played in a conventional manner. The player makes a wager, typically based on a predetermined denomination and a selected number of paylines. The reels are spun and game symbols or elements are randomly chosen for each cell. If a predetermined pattern of elements are randomly chosen for each cell on a played payline, the player is awarded a payout based on the payline, the wager, and a predetermined paytable. Many variations to the above described general play of a video slot game fall within the scope of the present invention. Such a video slot game 110 is well-known in the art, and is therefore not further discussed.

After the first instance 112A of the video slot game 110 is played, and any payout award to the player is paid, the game controller 12 detects any triggering condition within the outcome of the first instance 112A, i.e., the symbols or elements within the cells.

In one aspect of the present invention, the triggering condition is the appearance of a predetermined game element or symbol in a predetermined cell or cells.

With respect to the particular embodiment illustrated in FIG. 3, the triggering condition is a predetermined symbol, represented by "A", within every cell of the first column. However, it should be noted that the predetermined game element could be any one of the elements in the set of game elements, including "Wild". It should also be noted that the predetermined cell(s) do not need to be the first column. The predetermined cells could include one or more of the other cells scattered throughout the grid or one of the other columns. Furthermore, the predetermined cells may be randomly determined.

Figure 4:
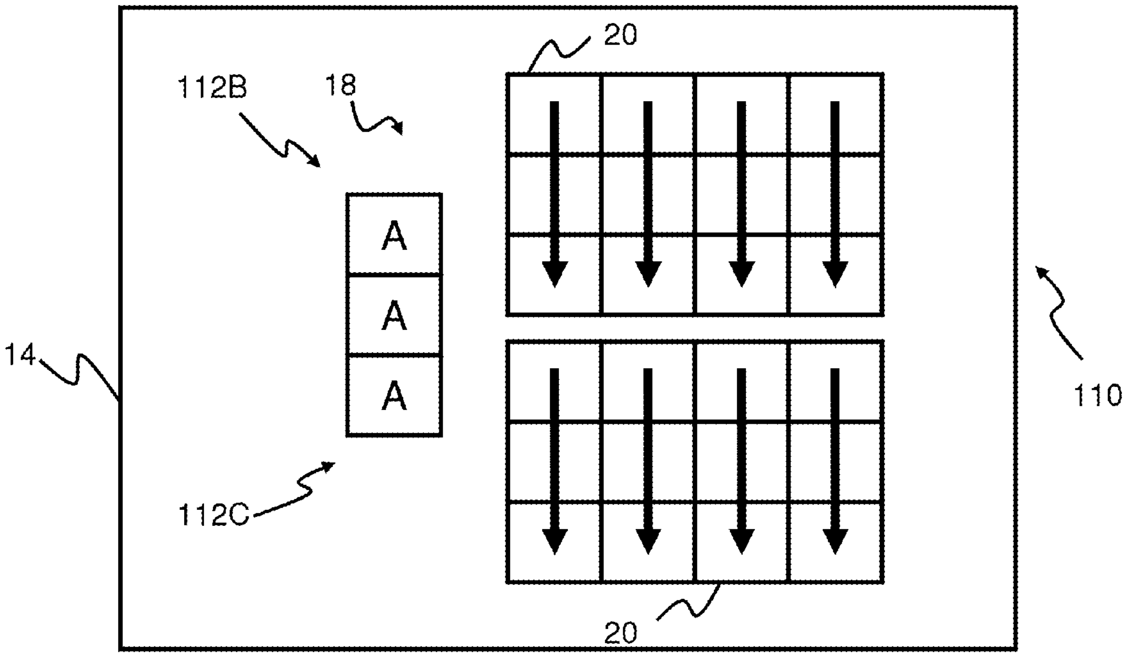
FIG. 4 is a second exemplary screenshot of a video slot game, according to the first embodiment of the present invention.

With particular reference to FIG. 4, once a trigger condition has been detected, the video game controller 12 splits the video slot game into two separate instances: a second instance 112B of the video slot game 110 and a third instance 112C of the video slot game 110.

Figure 5:
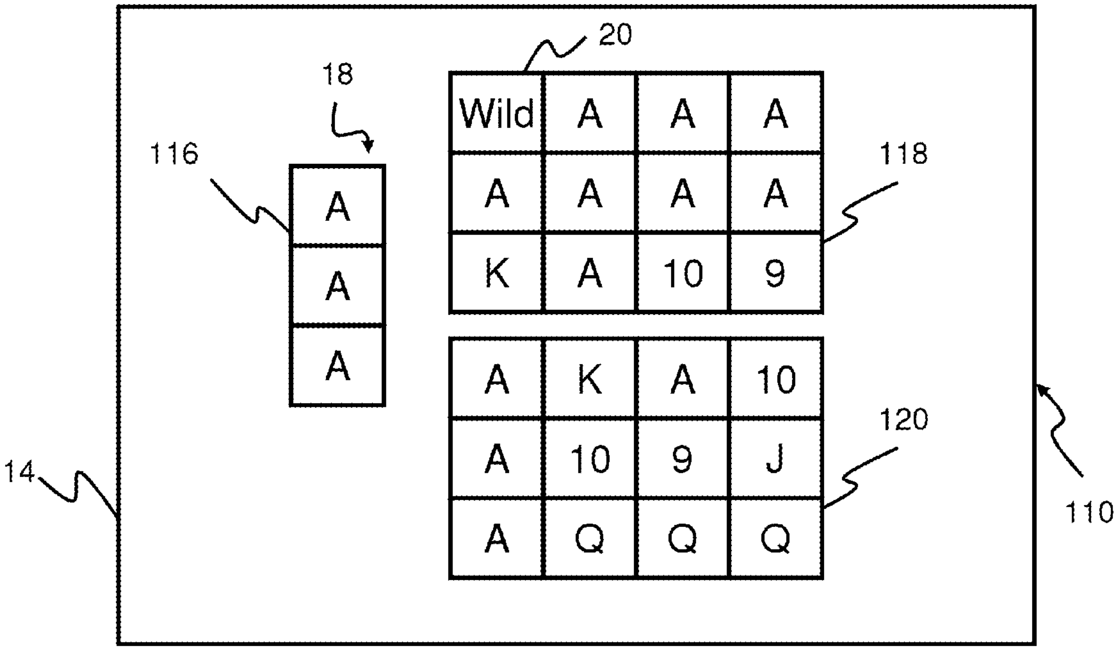
FIG. 5 is a third exemplary screenshot of a video slot game, according to the first embodiment of the present invention.

With particular reference to FIG. 5, in the instant embodiment, a first representation of the predetermined cells 116 with the predetermined symbol, e.g., "A", contained therein is displayed. First and second representations of the other cells 118, 120 are also displayed. Thus, the second instance 112B of the video slot game 110 includes the representation of the predetermined cells 116 and the first representation of the other cells 118 and the third instance 112C of the video slot game 110 includes the representation of the predetermined cells 116 and the second representation of the other cells 120.

As stated above, the predetermined symbol, e.g., "A", is held in the predetermined cells during play of the second and third instances 112B, 112C.

The second and third instances 112B, 112C of the video slot game are then played, i.e., the game controller 12 randomly selects new game elements for the remaining cells in both instances 112B, 112C (see FIG. 5). The outcome of the second instance 112B of the video slot game 110 is, thus, the combination of the representation of the predetermined cells 116 and the first representation of the other cells 118, and the outcome of the third instance 112C of the video slot game 110 is the combination of the representation of the predetermined cells 116 and the second representation of the other cells 118.

A second award may be played to the player as a function of the outcome of the second instance 112B of the video slot game 110 and a second predetermined paytable. A third award may be played to the player as a function of the outcome of the third instance 112C of the video slot game 110 and a third predetermined paytable.

In one embodiment, a single wager allows the player to play through all instances, e.g., the first, second and third instances of the video slot game. In another embodiment, a separate wager is required for each instance.

In one embodiment, the awards or payouts (if any) are made at the end of each respective instance. In another embodiment, the awards or payouts are grouped together in a single payout after all instances have been played.

Figure 6:
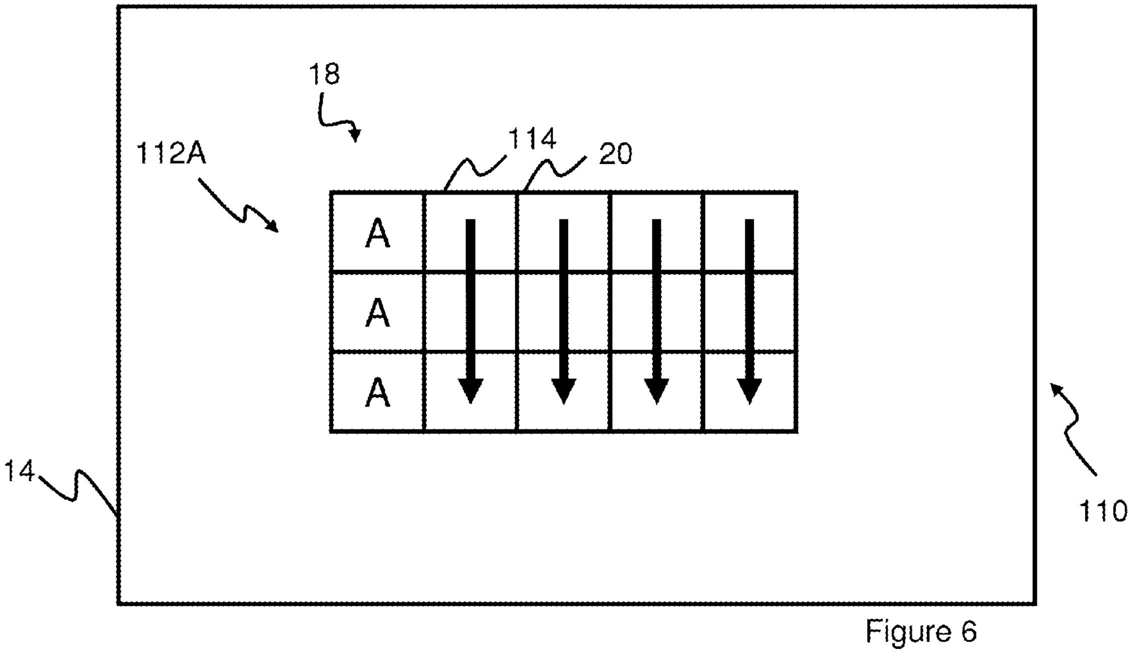
FIG. 6 is an exemplary screenshot of a video slot game, according to a second embodiment of the present invention.
Figure 7:
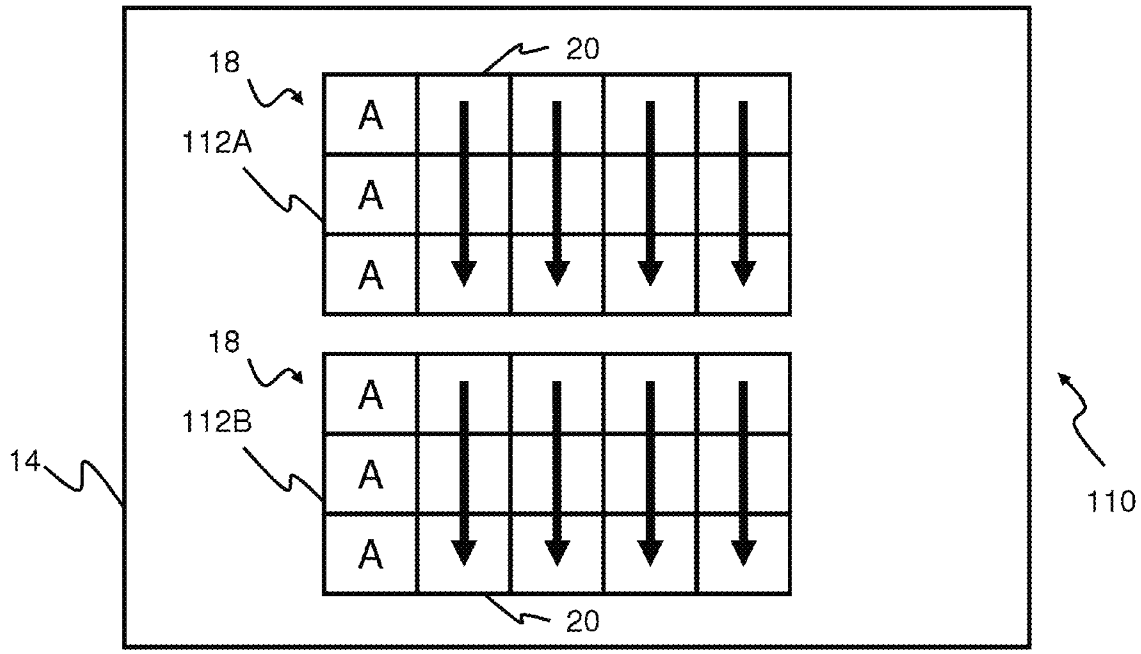
FIG. 7 is a second exemplary screenshot of a video slot game, according to the second embodiment of the present invention.
Figure 8:
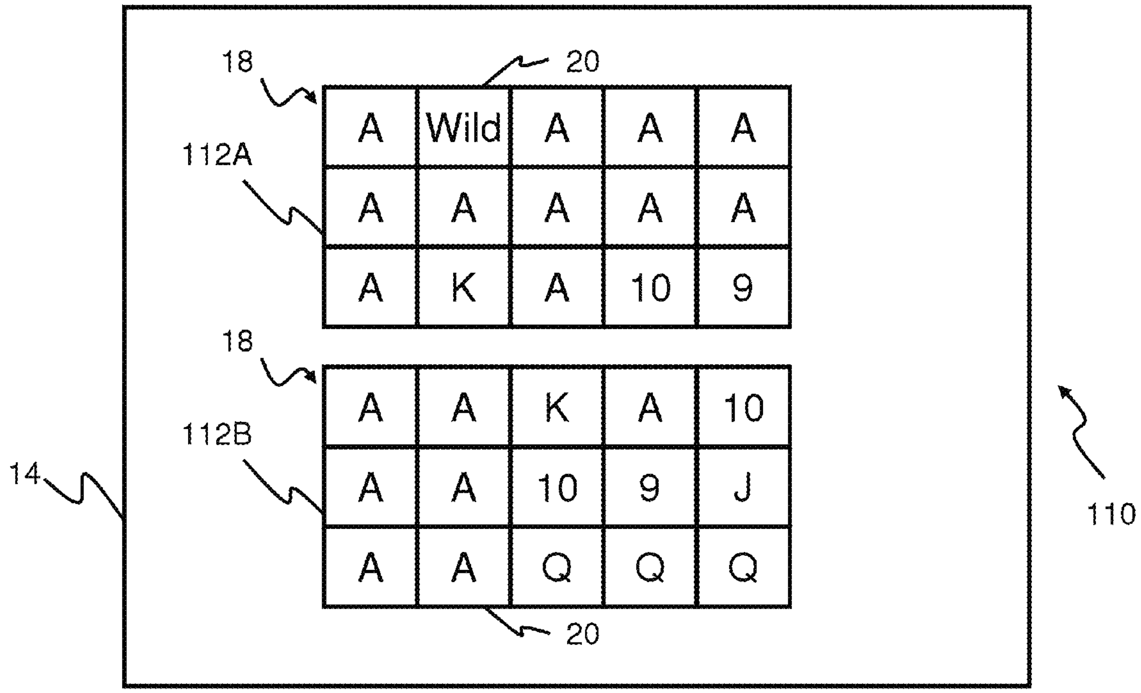
FIG. 8 is a third exemplary screenshot of a video slot game, according to the second embodiment of the present invention.

With particular reference to FIGS. 6-8, a second embodiment of the present invention is illustrated. Operation of this second embodiment is similar to the first embodiment, however, second and third instances 112B, 112C each include all of the cells of the grid 20.

It should be noted that the first, second, and third awards may include an award for multiple winning paylines. The awards may also be a function of the wager made by the player.

In one aspect of the present invention, the first, second and third paytables are the same. In another aspect of the present invention, the second and third paytables are the same, but different from the first paytable. In still another aspect of the present invention, all three paytables are different.

In another aspect of the present invention, a method of providing a video slot game 110 to a player is provided. The video slot game 110 includes a plurality of cells arranged in a grid having a plurality of rows and columns.

In a first step, a first instance of the video slot game 110 displayed on a video display device 14.

In a second step, the first instance of the video slot game 110 is played and an award is paid to the player as a function of an outcome of the first instance of the video slot game 110 and a predetermined paytable.

In a third step, a triggering condition in the outcome of the first instance of the video slot game 110 is detected. In one aspect of the present invention, the triggering condition includes a predetermined symbol located within at least one triggering cell of the video slot game 110 (see above).

In response to detecting the triggering condition, second and third instances 112B, 112C of the video slot game are simultaneously displayed on the video display device. The second and third instances 112B, 112C of the video slot game 110 are played. An award is paid to the player as a function of an outcome of the second instance of the video slot game and a second predetermined paytable. An award is paid to the player as a function of an outcome of the third instance of the video slot game and a third predetermined paytable. The predetermined symbol is copied into the at least one triggering cell of the second and third instances of the video slot game and is held throughout the play thereof.

Other aspects and features of the present invention can be obtained from a study of the drawings, the disclosure, and the appended claims.

What is claimed is:

1. A slot machine for displaying a video slot game, comprising:

a video display device; and, a game controller including a random number generator for generating random numbers for use in determining game outcomes, the game controller for randomly generating an outcome of a first instance of the video slot game, displaying the first instance on the video display device, and playing the first instance of the video slot game, the outcome of the first instance including a plurality of game symbols being displayed in a plurality of cells, the controller for detecting a triggering condition in the outcome of the first instance of the video slot game, the triggering condition including a predetermined symbol located within at least one triggering cell of the video slot game, the game controller, in response to detecting the triggering condition, for simultaneously displaying second and third instances of the video slot game on the video display device, for playing the second instance of the video slot game and awarding a first award to the player as a function of an outcome of the second instance of the video slot game and a first predetermined paytable, and for playing the third instance of the video slot game and awarding a second award to the player as a function of an outcome of the third instance of the video slot game and a second predetermined paytable, wherein the predetermined symbol is copied into the at least one triggering cell of the second and third instances of the video slot game and is held throughout the play thereof, wherein the first instance of the video slot game is split into the second and third instances of the video slot game.

2. A slot machine, as set forth in claim 1, wherein the game controller allows the player to make a wager, the first and second awards being a function of the wager.

3. A slot machine, as set forth in claim 1, wherein first, second, and third wagers are required for the first, second, and third instances of the video slot game, respectively.

4. A slot machine, as set forth in claim 1, wherein the first and second paytables are the same.

5. A slot machine, as set forth in claim 1, wherein the at least one triggering cell of the video slot game includes all of the cells of a single column.

6. A slot machine as set forth in claim 5, wherein the single column is the first column.

7. A slot machine, as set forth in claim 5, wherein the game controller in response to detecting the triggering condition displays on the display device a representation of the single column, a first representation of the remaining columns, and a second representation of the remaining columns, wherein the second instance of the video slot game includes the representation of the single column and the first representation of the remaining columns and the third instance of the video slot game includes the representation of the single column and the second representation of the remaining columns.

8. A slot machine, as set forth in claim 5, wherein the second and third instances of the video slot game includes the single column and the remaining columns.

9. A slot machine, as set forth in claim 1, wherein the game controller controls play of the video slot game by randomly selecting a game element from a predetermined set of game elements for each cell.

10. A slot machine, as set forth in claim 1, wherein the set of game elements includes a wild symbol.

11. A slot machine, as set forth in claim 10, wherein the wild symbol is the predetermined symbol.

12. A slot machine, as set forth in claim 10, wherein the triggering condition includes the predetermined symbol or the wild symbol located in the at least one triggering cell.

13. A slot machine, as set forth in claim 1, wherein the first award and the second awards may be combined into a single award paid to the players at the end of play of the second and third instances of the video slot game.

14. A method of providing a video slot game to a player with a slot machine including a video display device and a game controller including a random number generator for generating random numbers for use in determining game outcomes, the video slot game having a plurality of cells arranged in a grid having a plurality of rows and columns, comprising the steps of:

randomly generating an outcome of a first instance of the video slot game and displaying the first instance of a video slot game on the video display device;

playing, using the game controller, the first instance of the video slot game; and, detecting a triggering condition in the outcome of the first instance of the video slot game, wherein the triggering condition includes a predetermined symbol located within at least one triggering cell of the video slot game, and in response to detecting the triggering condition:

simultaneously displaying second and third instances of the video slot game on the video display device; and, playing, using the game controller, the second and third instances of the video slot game, awarding a first award to a player as a function of an outcome of the second instance of the video slot game and a first predetermined paytable, and awarding a second award to a player as a function of an outcome of the third instance of the video slot game and a second predetermined paytable, wherein the predetermined symbol is copied into the at least one triggering cell of the second and third instances of the video slot game and is held throughout the play thereof, wherein the first instance of the video slot game is split into the second and third instances of the video slot game.

15. A method, as set forth in claim 14, wherein the first and second paytables are the same.

16. A method, as set forth in claim 14, wherein the at least one triggering cell of the video slot game includes all of the cells of a single column.

17. A method, as set forth in claim 16, wherein the single column is the first column.

18. A method, as set forth in claim 16, wherein the step of simultaneously displaying second and third instances of the video slot game on the video display device includes the steps of displaying on the display device a representation of the single column, a first representation of the remaining columns, and a second representation of the remaining columns, wherein the second instance of the video slot game includes the representation of the single column and the first representation of the remaining columns and the third instance of the video slot game includes the representation of the single column and the second representation of the remaining columns.

19. A method, as set forth in claim 16, wherein the second and third instances of the video slot game includes the single column and the remaining columns.

20. A method, as set forth in claim 14, wherein the first award and the second awards may be combined into a single award paid to the players at the end of play of the second and third instances of the video slot game.

* * * * *